A. RUNDALL.
TRACTOR.
APPLICATION FILED DEC. 23, 1918.
1,335,461. Patented Mar. 30, 1920.
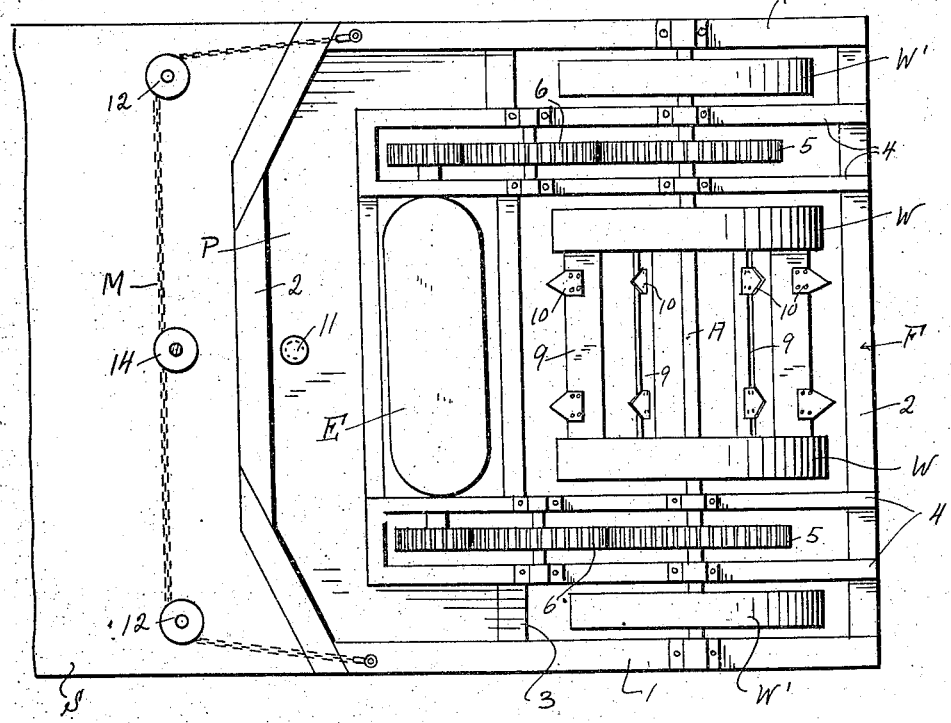
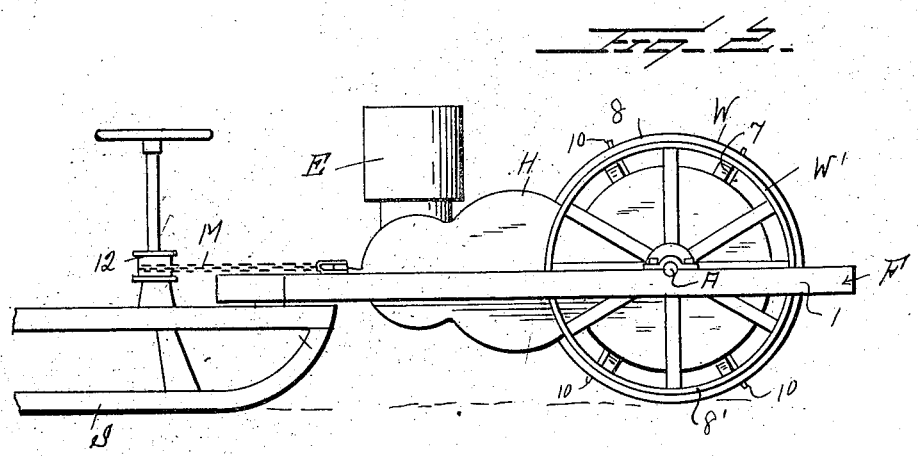
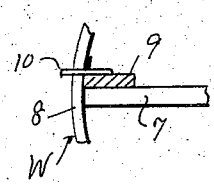
Inventor
A. Rundall
By Watson E. Coleman
Attorney

UNITED STATES PATENT OFFICE.

ADOLPH RUNDALL, OF JUNEAU, TERRITORY OF ALASKA.

TRACTOR.

1,335,461.   Specification of Letters Patent.   Patented Mar. 30, 1920.

Application filed December 23, 1918. Serial No. 268,025.

*To all whom it may concern:*

Be it known that I, ADOLPH RUNDALL, a citizen of the United States, residing at Juneau, in the Territory of Alaska, have invented certain new and useful Improvements in Tractors, of which the following is a specification, reference being had to the accompanying drawings.

This invention relates to certain improvements in tractors and has relation more particularly to a device of this general character especially designed and adapted to travel over snow and ice, and it is an object of the invention to provide a tractor of this kind embodying novel and improved means whereby the same may be employed as a steering medium when the same is coupled to a sled or other vehicle.

It is also an object of the invention to provide a novel and improved device of this general character including pairs of driven traction wheels and wherein the wheels of each pair are of different diameters in order to facilitate steering.

The invention consists in the details of construction and in the combination and arrangement of the several parts of my improved tractor whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan, with portions in section, of a tractor constructed in accordance with an embodiment of my invention and in applied position, a coacting sled being shown in fragment.

Fig. 2 is a view in side elevation of the device as illustrated in Fig. 1, and

Fig. 3 is a fragmentary view, partly in elevation and partly in section, illustrating one of the plates 9 and parts concomitant thereto.

As disclosed in the accompanying drawings, F denotes an elongated frame and which frame includes the side sills 1, the end sills 2 and an intermediate cross sill 3. Interposed between an end sill 2 and a cross sill 3 is a platform P upon which is supported an engine E, preferably of an internal combustion type.

Connecting the second end sill 2 and the intermediate sill 3 at opposite sides of the frame F are the spaced sills 4 arranged in parallelism to each other and to the adjacent side sill 1.

Rotatably supported by the sills 1 and 4 and extending transversely of the frame F is an axle A, and fixed to said axle between each pair of sills 4 is a gear wheel 5 meshing with the idler gears 6 rotatably supported between each pair of sills 4. Each of the gears 6 is preferably of a diameter materially less than the diameter of the coacting gear 5 and is operatively engaged in any preferred manner with the engine E, but preferably directly engaged with the driving or crank shaft of such motor.

Fixed to the axle A inwardly of and in close proximity to the inner sills 4 are the wheels W of a conventional type and which include the spokes 7. Connecting similar spokes of both of the wheels W and in close proximity to the rim 8 thereof are the plates 9 having their flat surfaces substantially radially disposed with respect to the wheels W. These plates engage the snow in a manner to effect the desired traction and in a manner which is believed to be clearly apparent to those skilled in the art to which my invention appertains.

Each of the plates 9 adjacent its opposite ends is provided with an outstanding pointed calk or lug 10, each of which is of a length to terminate outwardly of the peripheries of the wheels W so that when the device is traveling over ice, the wheels W are held against slipping and the efficiency of the device assured.

Between each of the side sills 1 and the adjacent outer sill 4 is affixed a wheel W' of a diameter less than the diameter of the adjacent wheel W. The wheel W' also rides upon the surface of the snow, but by having the wheel W' of a diameter less than that of the adjacent wheel W, steering of the device is materially facilitated. The wheels w and w' also coöperate to provide a traction surface substantially the width of the frame.

I also wish to state that it is preferred that the rims 8 of the wheels W and the rims 8' of the wheels W' be broad in order to facilitate the travel of the same over snow.

Each set of gears 5 and 6 is incased within a housing H so that clogging of the gears by snow or other interference therewith is prevented.

The end portion of the frame F provided with a platform P overlies preferably the end portion of a sled S and is coupled thereto by the king bolt 11, whereby the frame F is permitted to have lateral swinging movement relative to the sled S in order to effect a steering operation.

The inner end portions of the side sills 1 of the frame have secured thereto the extremities of a flexible member M, preferably a chain, and which member is directed around the guide pulleys 12 carried by the sled S and operatively engaged with a drum or pulley 14. The drum or pulley 14 may be rotated in any desired manner and the direction of swing of the frame F will be in accordance with the direction of rotation of the drum 14.

In practice, it is preferred that my improved tractor be coupled with the forward end portion of a sled S or other vehicle, although substantially the same structure may be arranged within the central portion of a long sled for trails. However, as this latter arrangement is not believed to constitute invention, a detail description and illustration of this particular arrangement are believed unnecessary.

From the foregoing description, it is thought to be obvious that a tractor constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A tractor comprising a frame, a single driven axle supported by and extending transversely of the frame, a ground engaging tractor wheel fixed to the axle adjacent each end thereof, a pair of ground engaging tractor wheels fixed to the axle adjacent its intermediate portion, plates connecting the peripheral portions of the second mentioned tractor wheels, the first mentioned traction wheels being smaller in diameter than the second mentioned traction wheels, all of said traction wheels coöperating to provide a ground engaging traction surface extending substantially transversely of said frame.

ADOLPH RUNDALL.